(12) United States Patent
Jackson et al.

(10) Patent No.: US 8,613,342 B2
(45) Date of Patent: Dec. 24, 2013

(54) HYDRAULIC DRIVE SYSTEM FOR MOTORIZED POWER EQUIPMENT

(75) Inventors: Gordon W Jackson, Clayton, NC (US); William R. Best, Benson, NC (US); Harold E. Mills, Raleigh, NC (US)

(73) Assignee: GXi Holdings, LLC, Clayton, NC (US)

( * ) Notice: Subject to any disclaimer, the term of this patent is extended or adjusted under 35 U.S.C. 154(b) by 364 days.

(21) Appl. No.: 12/749,863

(22) Filed: Mar. 30, 2010

(65) Prior Publication Data

US 2011/0083413 A1    Apr. 14, 2011

Related U.S. Application Data

(60) Provisional application No. 61/251,270, filed on Oct. 13, 2009.

(51) Int. Cl.
*B60K 17/00* (2006.01)
*B60K 7/00* (2006.01)

(52) U.S. Cl.
USPC ............................. 180/305; 180/308

(58) Field of Classification Search
USPC .............. 180/305, 308, 65.51, 55, 56, 58, 62; 56/10.1, 10.8, 14.7, 16.4 R; 301/6.1, 301/137
See application file for complete search history.

(56) References Cited

U.S. PATENT DOCUMENTS

| | | | | |
|---|---|---|---|---|
| 2,925,222 A * | 2/1960 | Spreng | ........................... | 239/78 |
| 4,478,027 A * | 10/1984 | De Coene et al. | ......... | 56/16.4 R |
| 4,558,558 A * | 12/1985 | Horner et al. | .................. | 56/11.3 |
| 4,759,417 A * | 7/1988 | Wanie et al. | .................. | 180/6.34 |
| 5,343,678 A * | 9/1994 | Stuart | ............................. | 56/11.3 |
| 5,826,414 A * | 10/1998 | Lenczuk | ......................... | 56/14.7 |
| 6,098,385 A * | 8/2000 | Turk | ............................. | 56/11.3 |
| 6,185,920 B1 * | 2/2001 | Oxley | ............................. | 56/14.7 |
| 6,189,641 B1 * | 2/2001 | Azuma | .......................... | 180/242 |
| 6,643,959 B2 * | 11/2003 | Jolliff et al. | ..................... | 37/244 |
| 6,758,290 B2 * | 7/2004 | Jolliff et al. | ................. | 180/6.48 |
| 7,044,259 B2 * | 5/2006 | Stoll et al. | ..................... | 180/307 |
| 7,458,311 B2 * | 12/2008 | Korthals | ........................ | 92/12.2 |
| 7,540,102 B2 * | 6/2009 | Olmr et al. | ..................... | 37/245 |
| 7,596,934 B2 * | 10/2009 | Waesche et al. | ............... | 56/11.9 |
| 8,028,776 B2 * | 10/2011 | Dong et al. | .................. | 180/6.48 |
| 8,100,204 B2 * | 1/2012 | Dong et al. | .................. | 180/6.48 |
| 2004/0099464 A1 * | 5/2004 | Bednar | ......................... | 180/306 |
| 2006/0039801 A1 * | 2/2006 | Dong et al. | ................... | 417/269 |
| 2007/0137918 A1 * | 6/2007 | Dong et al. | .................. | 180/305 |
| 2007/0151222 A1 * | 7/2007 | Iida et al. | ......................... | 56/157 |
| 2008/0034721 A1 * | 2/2008 | Waesche et al. | ............... | 56/11.9 |
| 2008/0120974 A1 * | 5/2008 | Dong et al. | ..................... | 60/464 |

* cited by examiner

*Primary Examiner* — Jeffrey J Restifo
*Assistant Examiner* — James M Dolak
(74) *Attorney, Agent, or Firm* — James G. Passé; Passé Intellectual Property, LLC

(57) ABSTRACT

A wheel hub assembly for use in powered lawn equipment is disclosed. The wheel hub assembly has a receiving member which is coupled to an intermediate shaft having an intermediate gear. The intermediate gear is coupled to an output shaft having an output gear. The output shaft is connected to an output hub; the intermediate shaft gear meshes with the output gear such that when the receiving pulley is rotated in one direction, the output hub rotates in the opposite direction.

6 Claims, 13 Drawing Sheets

HYDRAULIC DRIVE SYSTEM FOR MOTORIZED POWER EQUIPMENT

This application claims priority of provisional application 61/251,270 filed on Oct. 13, 2009 and is included herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to motorized power equipment and more specifically to a hydraulic drive system for motorized power equipment.

2. Description of Related Art

With the advent of motorized power equipment, various ways of propelling the power equipment have been developed. For example, early self propelled lawn mowers employed gear driven transmissions. In these lawn mowers, the drive shaft of the motor would provide power to a transmission which directs power to an axle or drive shaft of the wheels. Similar to a car, the speed of the propulsion system is dependant upon the gear used.

Over time, hydrostatic transmissions were used as an intermediate stage between the drive shaft of the engine and the wheels. Within hydrostatic transmissions, hydraulic pumps were used to provide the rotational energy to the drive systems. Powered lawn equipment typically needs the engine to operate at full speed at all times to not only operate blades of a mower, but also provide energy to drive the lawn mower. Hydrostatic transmissions receive the constant energy from the engine and provide variable output speeds.

Hydraulic pumps are typically engaged by a belt which is linked back to the drive shaft of the engine. As the drive shaft of the engine turns, the drive belt turns the hydro input and hydraulic fluid pumps. Even though fluid may be pumping within the hydraulic pump, pressure does not build until a swash plate is tilted. The direction the swash plate is tilted controls the rotational direction of the output shaft (forward and reverse). In addition, the amount of tilting that the swash plate experiences determines the rotational speed applied to the wheels of the lawn equipment. The greater the degree of displacement or tilt, the higher the output speed. While the engine is turning and as the swash plate tilts, pistons within the hydraulic pump begin to pump fluid which in turn rotates an output drive shaft. The output drive shaft of a hydraulic pump tends to rotate quickly but with relatively low torque. In prior art drive systems, the output drive shaft has various gear assemblies attached thereto allowing the appropriate amount of torque to be applied to the drive assemblies. The drive assemblies are typically attached to a wheel or set of wheels. Thus, as the engine drive shaft turns, the hydraulic pump circulates hydraulic fluid which rotates the output drive shaft and the wheel or wheels turn. Those skilled in the art appreciate that the output speed of the hydraulic motors may be varied by controlling the volume of fluid being pumped through the hydraulic motor.

One drawback of the prior drive systems is the lack of flexibility of the placement of the propulsion systems. For example, the output drive shaft of a hydraulic motor would have gears or a gear train attached and any wheel attached would be fixed into place by the gearing assemblies. Essentially, the gears extend radially away from the output drive shaft and if a different size wheel was required, a whole new gear system would need to be implemented. Alternatively, even if the gearing was acceptable, any change in chassis's height presented the need to redesign the gears or gearing assembly. In addition, should different gear ratios be required, an entirely new gear assembly and housings would need to be designed and implemented into the power equipment or worse, a total redesign of the lawn equipment would be necessary. There is typically no way of changing the gear ratios in the field by replacing one gear.

In most power equipment assemblies, there is very little room under the chassis for all of the drive mechanisms. As a result, power equipment manufacturers may find it advantageous to be able to move the wheel hub assembly away from the hydraulic motor. The present invention allows the wheel hub to be attached to the hydraulic motor via a rotational drive assembly. This also allows the output drive of the propulsion system to be located outside the confines of the chassis, thus eliminating clutter and freeing up space. The rotational assembly may have a replaceable receiving pulley that may be changed in the field. By changing the diameter of the receiving pulley, the drive ratio of the propulsion system may be changed. In addition, by using the various aspects of the present invention, the wheel hub may be located in different locations under the chassis, so long as the rotational drive assembly may connect to the output drive shaft of the hydraulic pump. In addition, the wheel hub of the present invention may be mounted on the outside of the frame, thus moving the wheel hub out from inside the chassis area.

SUMMARY OF THE INVENTION

A wheel hub assembly for use in powered equipment is disclosed. The wheel hub assembly has a receiving member which is coupled to a drive shaft. The drive shaft extends away from the receiving member to the output hub through a drive housing and is attached to an output hub, wherein the receiving member is configured to receive a linkage member, the linkage member is connected to an output drive.

A wheel hub assembly for use in powered equipment is disclosed. The wheel hub assembly has a receiving member which is coupled to an intermediate shaft which has an intermediate gear. The intermediate gear is coupled to an output shaft having an output gear. The output shaft is connected to an output hub, wherein the intermediate gear meshes with the output gear such that when the receiving member is rotated in one direction, the output hub rotates in the opposite direction. The receiving member is configured to receive a linkage member, the linkage member connecting the receiving member to an output drive A powered lawn mower is disclosed. The lawn mower has an engine providing rotational energy through a drive belt to a hydro static transmission. The hydrostatic transmission has fluid and the hydrostatic transmission receives the rotational energy from the engine which causes the fluid to pump. The hydrostatic transmission also has an output member which is rotated by the pumping of the fluid. The output member is connected to a receiving member of a wheel hub assembly by a linkage member. The receiving member is also connected to an intermediate shaft having an intermediate gear coupled thereto. The wheel hub assembly also has an output shaft that has an output gear. The output shaft is connected to an output hub, wherein the intermediate gear meshes with the output gear such that when the receiving member is rotated in one direction, the output hub rotates in the opposite direction.

DETAILED DESCRIPTION OF THE INVENTION

Figure 1:
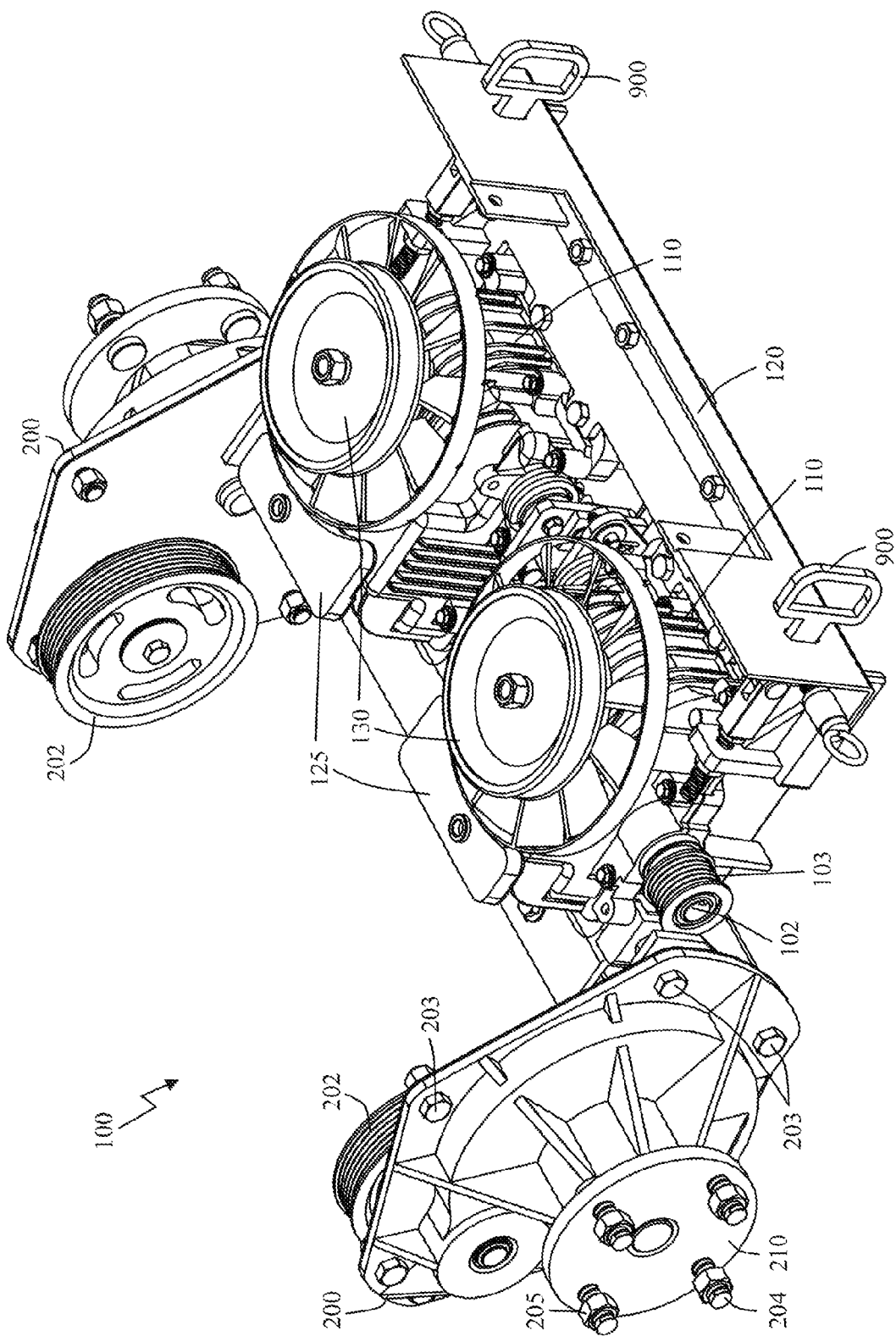
FIG. 1 displays a rear perspective view of a hydraulic drive system in accordance with one aspect of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

FIG. 1 displays a rear perspective view of a drive system 100 in accordance with one embodiment of the present invention. As shown in FIG. 1, the drive system 100 has two integrated hydrostatic transmissions 110 mounted on a chassis 120 and two integrated wheel hub assemblies 200. In alternative embodiments, only one hydrostatic transmission 110 and one integrated wheel hub assembly 200 may be used if the drive system 100 is only turning one wheel. In yet another alternative embodiment, a drive system 100 may have a hydrostatic transmission and integrated pump assembly which together may be integrated with a through axle. In this embodiment, the drive system may be used to provide power to the through axle and turn both wheels in positive traction at all times.

As described herein, the hydrostatic transmissions 110 contain a hydraulic pump and motor. For ease of description, the hydrostatic transmissions 110 may have the hydraulic pump and motor integrated, however, the inventive concepts are not limited to an integrated hydraulic motor and pump. In one exemplary embodiment, the hydrostatic transmissions 110 may be mounted on a bottom side of chassis 120 or on a separate carrier plate that is in turn attached to the chassis. To better illustrate the inventive concepts, a top portion of the chassis 120 has been cut away allowing a clear view of the hydrostatic transmissions 110. The hydrostatic transmissions 110 are connected to an engine via a drive belt (not shown for ease of illustration). The drive belt attaches to hydraulic input pulleys 130 which are mounted on the top of the hydrostatic transmissions 110. In the embodiment of FIG. 1, the drive belt may attach to both hydraulic input pulleys 130.

In one embodiment, the hydrostatic transmissions 110 may contain hydraulic fluid. In describing the present invention, hydraulic fluid may be used as an exemplary fluid. However, the inventive concepts as presented herein do not require that hydraulic fluid be used. Alternative fluids instead of hydraulic fluid such as, but not limited to, transmission fluid, motor oil, vegetable oil, peanut oil and the like may be used. Regardless of the fluid type, the fluid is stored in the hydraulic transmission housing. Expansion chamber 125 is atmospherically vented and provides a place for hydraulic fluid to go when the fluid expands due to heat and pressure.

When the engine is in operation, the drive belt causes rotation of the hydraulic input pulleys 130 and hydraulic fluid is pumped within the hydrostatic transmissions 110. As those skilled in the art may appreciate, hydrostatic transmissions have been used in power equipment for many years and some exemplary integrated hydraulic pump and motor combinations may be the model #2100-006A (right side hydraulic motor) and #2100-007A (left side hydraulic motor) manufactured by Peerless Gear. As hydraulic fluid is pumped within the hydrostatic transmissions 110, the motion of the pumping fluid is turned into rotational energy which is directed out the output shaft 102. Hydraulic pumps may be selected for various applications depending on the amount of RPM's or the torque the output shaft 102 may be required to make.

As is typical in hydraulic pump applications, the amount of fluid being pumped may be varied in order to vary the output speed of the hydrostatic transmissions 110. Thus, when the engine is turning at a constant speed, the speed of the hydrostatic transmissions 110 may be varied without changing the engine speed, thus changing the rotational speed of the output shaft 102. As mentioned previously, this is performed by adjusting the tilt of the swash plate which in turn changes the amount of piston movement which directly corresponds to the amount of fluid being pumped.

Unlike prior art hydraulic drives, the rotational energy of the hydrostatic transmissions 110 of the drive system 100 is not axially coupled to multiple gears that are directly connected to a drive shaft of a wheel. In these prior art drive systems, gears turning the drive shaft of the wheels are on set center distances with relation to the hydrostatic output shaft. Essentially, the prior art output drive shaft typically extends axially outwards away from the hydraulic motors and a main gear would be attached thereon. The main gear would then be coupled with another gear or set of gears to provide a step down conversion. Thus, when the hydraulic motors were rotating at high RPM's, the gears would step down this rotational energy to provide a different rotational energy to the wheels that would be a slower RPM but at a higher torque. This may be accomplished by the use of an intermediate gear set that may consist of a large driven gear coupled to a small driving pinion. As mentioned previously, a significant drawback of the prior art drive systems is that the position of the drive wheels needs to be relatively close to the hydraulic motors and needs to be positioned with static gear centers. With these prior art designs, in order to change axle speeds, new gears, gear centers and the housing may have to be redesigned, tooled and built.

Positioned at the end of the output drive shaft 102 of the hydrostatic transmission 110 is an output member. In the embodiment of FIG. 1, the output member may be an output pulley 103. It is appreciated by those skilled in the art, in different embodiments, other types of output member may also be used such as, but not limited to, toothed gear sprockets, notched pulleys and the like.

Attached to the output member 103, in this case a pulley, is a linkage member such as a belt or chain. In the embodiment of FIG. 1, the linkage member attached to the output pulley 103 is a "Multi V-belt." As those skilled in the art appreciate, Multi V-belts may be used in various motorized applications. Multi V-belts may be used in applications where grip is important. The width of the Multi V-belt and the amount of ribs on the Multi V-belt may be determined by the amount of torque transfer required to turn an associated receiver pulley. In one exemplary embodiment, the Multi V-belt may have 6 ribs matching up to an output pulley 103 having 6 grooves to accept the ribs. In another embodiment, the output pulley 103 could have 8 grooves to accept the 8 ribs of a Multi V-belt having 8 ribs. The number of grooves and ribs may vary and the inventive concepts of the present invention may be applied to any quantity of grooves and ribs. In another alternative embodiment, a timing belt may be used instead of a Multi V-belt. In yet another embodiment, a link chain or roller chain may be attached to the output drive shaft 102. In this example, gears with teeth would be mounted on the output drive shaft 102 to match up with the chain.

Referring back to FIG. 1, the wheel hub assembly 200 has a receiving member that receives rotational energy from the output pulley 103 of the hydrostatic transmission 110. In the embodiment of FIG. 1, a receiving pulley 202 may be one exemplary receiving member and a Multi-V belt may be attached thereto. In other alternative embodiments, a gear sprocket or notched pulley may also be used to couple the linkage member to the output shaft. The wheel hub assembly 200 may be mounted to a frame by securing bolts 203 (see FIG. 10)

Figure 2:
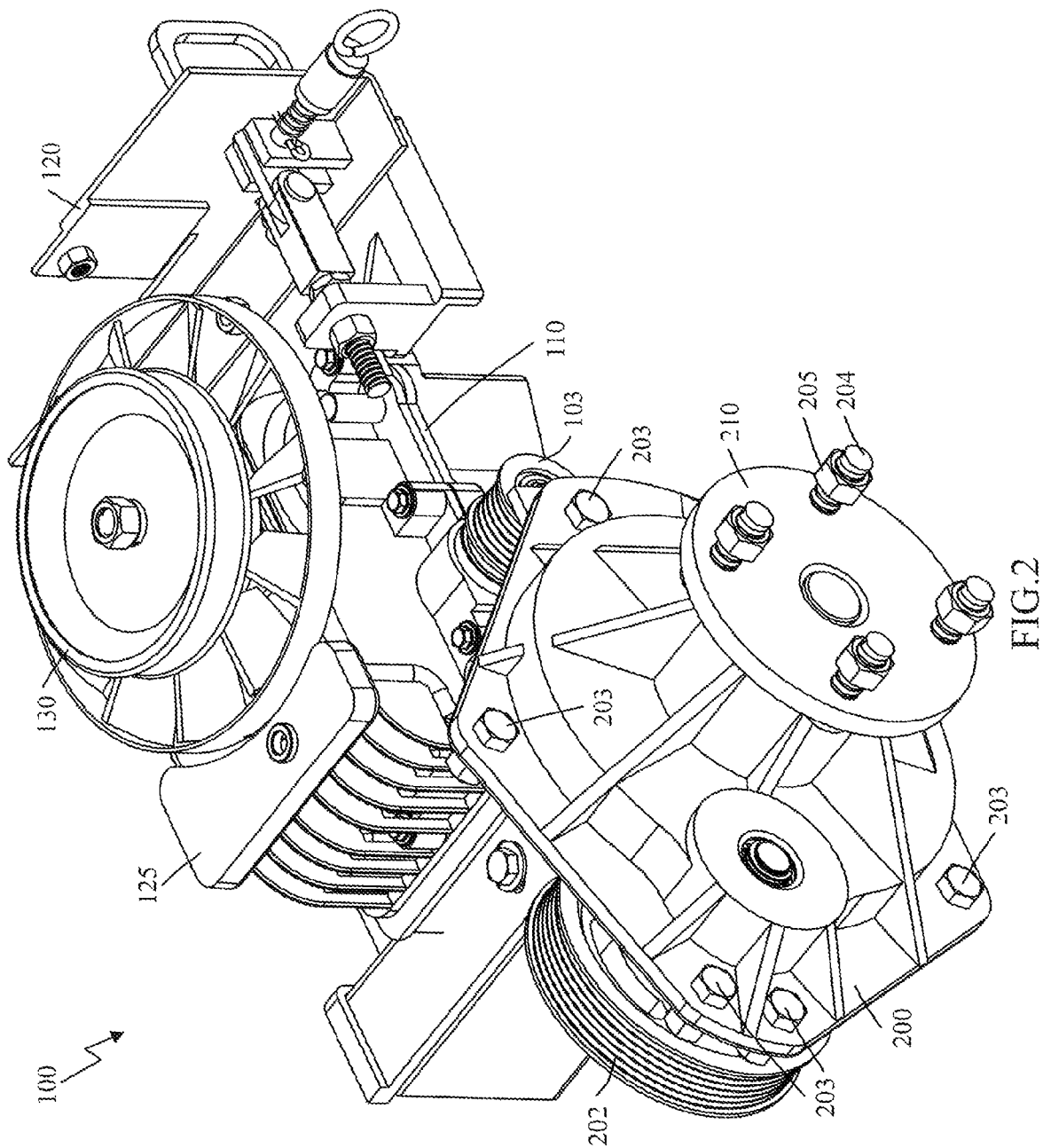
FIG. 2 shows a side perspective view of half of the hydraulic system of FIG. 1.

As can be seen in FIGS. 1 and 2, the wheel hub assembly 200 has four lugs 204 with lug nuts 205 on output hub 210. A wheel (not shown for ease of illustration) may be attached to the wheel hub assembly 200 by mounting the wheel on the lugs 204 and attaching the lug nuts 205. Although the present inventive concepts are described with reference to a four lug wheel, other embodiments may include any number of lugs or even just an output shaft which may be tapered, grooved, threaded, keyed, splined or the like.

By utilizing a Multi V-belt or other type of rotational drive mechanism, the wheel hub assembly 200 may be placed at different orientations with regards to the hydrostatic transmissions 110. For example, the wheel hub assembly 200 may be moved lower or higher relative to the hydrostatic transmissions 110, as long as the output pulley 103 and the receiving pulley 202 can be connected by Multi-V belt or other alternative. As can be seen in FIGS. 1 and 2, the output pulley 103 and the receiving pulley 202 are roughly on the same plane. Thus, the hydraulic motor 110 may be positioned 360 degrees around the wheel hub assembly 200 should it be desired to maintain the wheel hub assembly in a specific location. Conversely, the wheel hub assembly 200 may be positioned 360 degrees around the hydraulic motor 110 should it be desired to maintain the hydraulic motor in a specific location.

Having the flexibility of locating the wheel hub assembly 200 at different locations from the hydrostatic transmissions 110 allows the power equipment manufacturer to vary the location of the wheel hub assembly 200 without having to redesign the entire drive system 100, chassis or complete mower. For example, if additional clearance is required on a new model of power equipment, the chassis 120 that houses the hydrostatic transmissions 110 may be raised to a higher position in relation to the wheel hub assembly 200. The output pulley 103 and the receiving pulley 202 may need to remain on the same plane. As a result, the same hydrostatic transmissions 110 and wheel hub assembly 200 may be used on various models of power equipment with different clearances. Should the distance between the output pulley 103 and the receiving pulley 202 increase or decrease due to the higher clearance requirement, a longer or shorter Multi V-belt, timing belt or chain may be used without having to redesign the drive system 100. In addition, the chassis can also remain at the same height even when the wheel height changes. The wheel hub may be rotated (in relation to the output drive) in order to change the axle location.

Another advantage of the present invention is the ability to change tire sizes without having to redesign the drive system 100. A larger tire size can be accommodated by moving the wheel hub assembly 200 final drive mounting location. Although the final drive pulley may need to move, the output axle can be placed around the pulley shaft. In this embodiment, nothing has to change on the lawn mower except the addition of a few holes to mount the output drive. In addition, the pulley ratios can be changed to increase or decrease top speed as well as increase or decrease torque depending on the demand of the product. For example, the propulsion system could be low speed, high torque—or—high speed, low torque. The same belt size may be used if both the pulleys' diameters change to be closer together to get the pulley ratio closer to 1:1.

Figure 3:
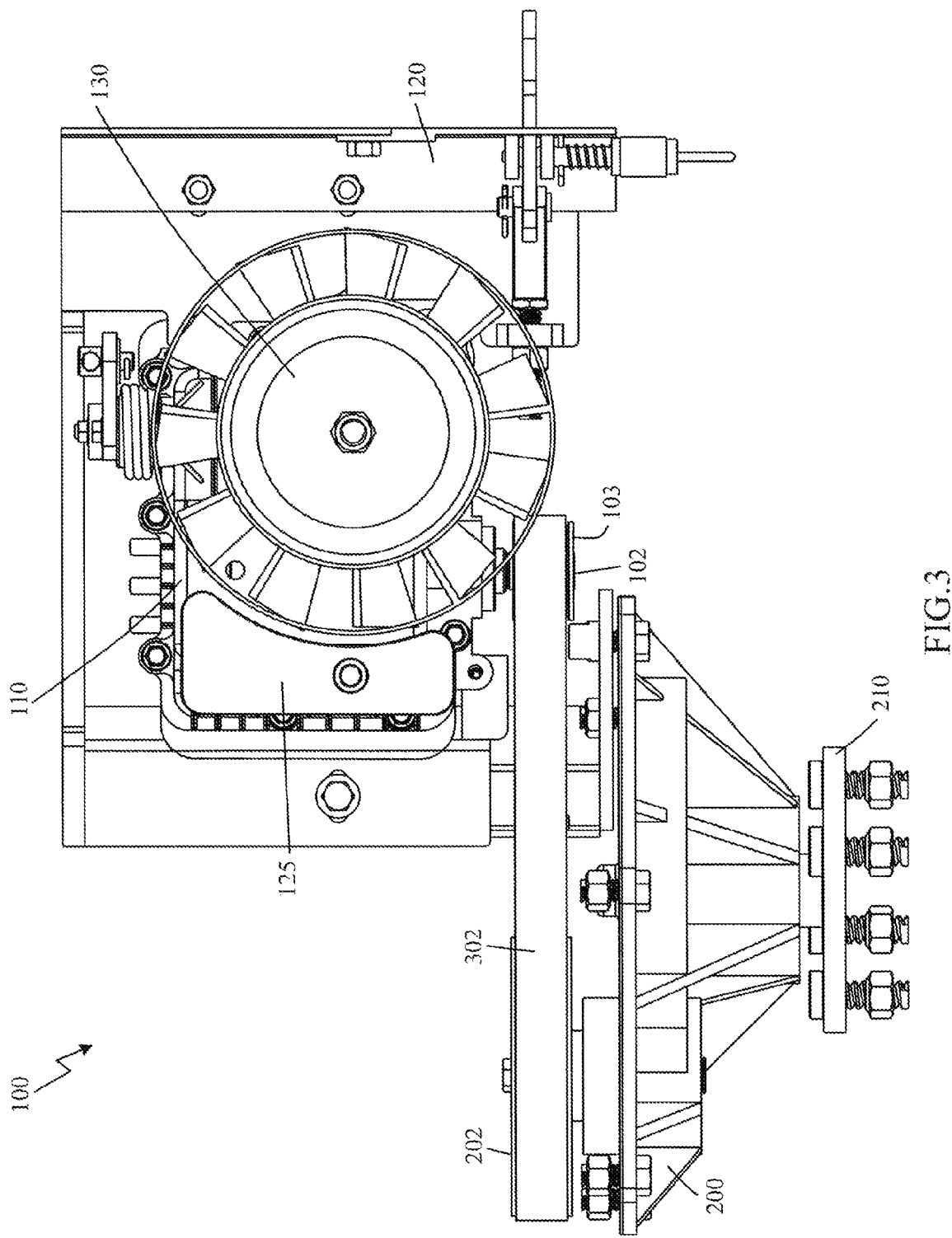
FIG. 3 displays a top view of half of the hydraulic system of FIG. 1.
Figure 4:
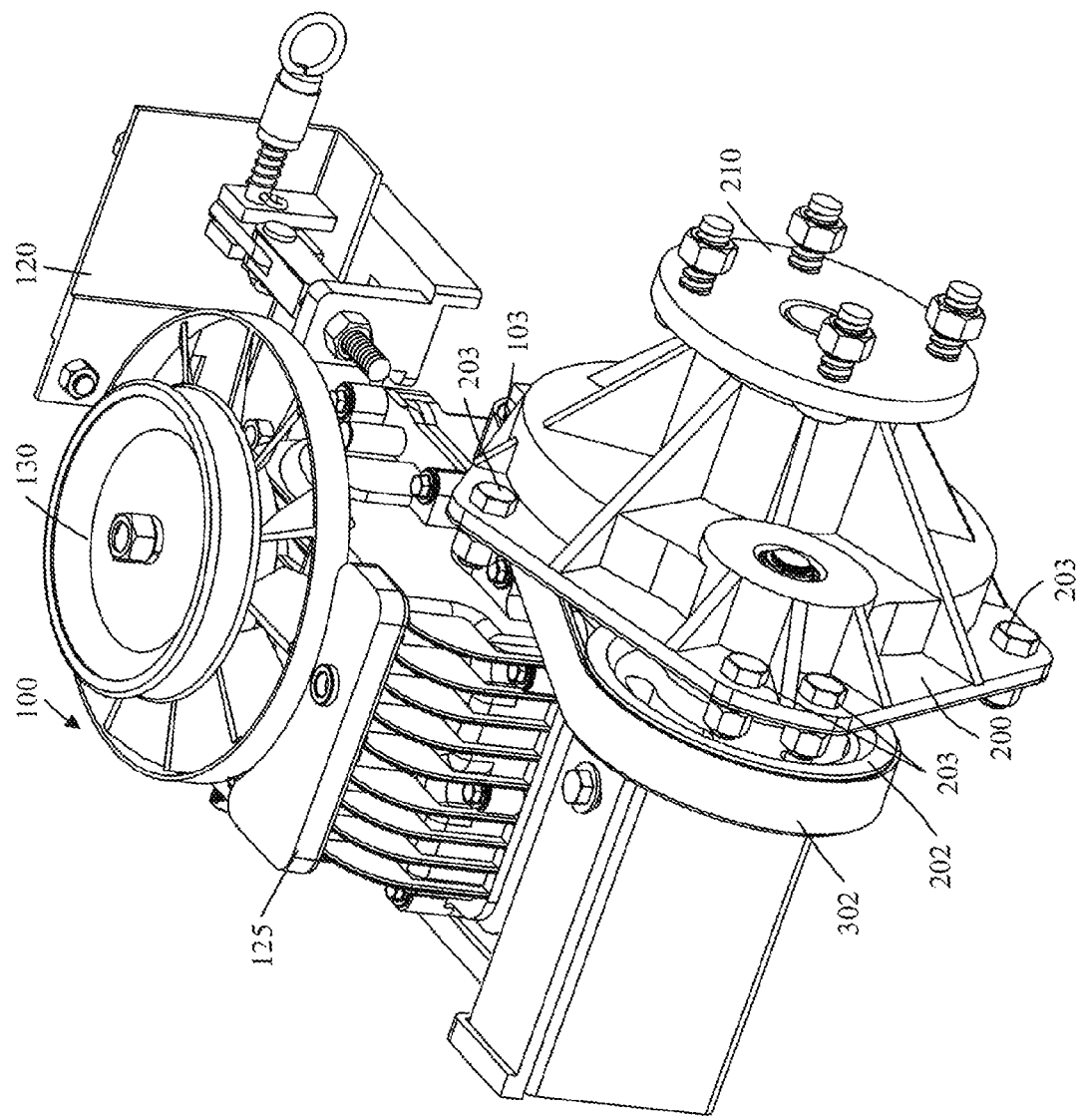
FIG. 4 shows a front perspective view of half of the hydraulic system of FIG. 2 with a Multi V-Belt attached in accordance with yet another aspect of the present invention.
Figure 5:
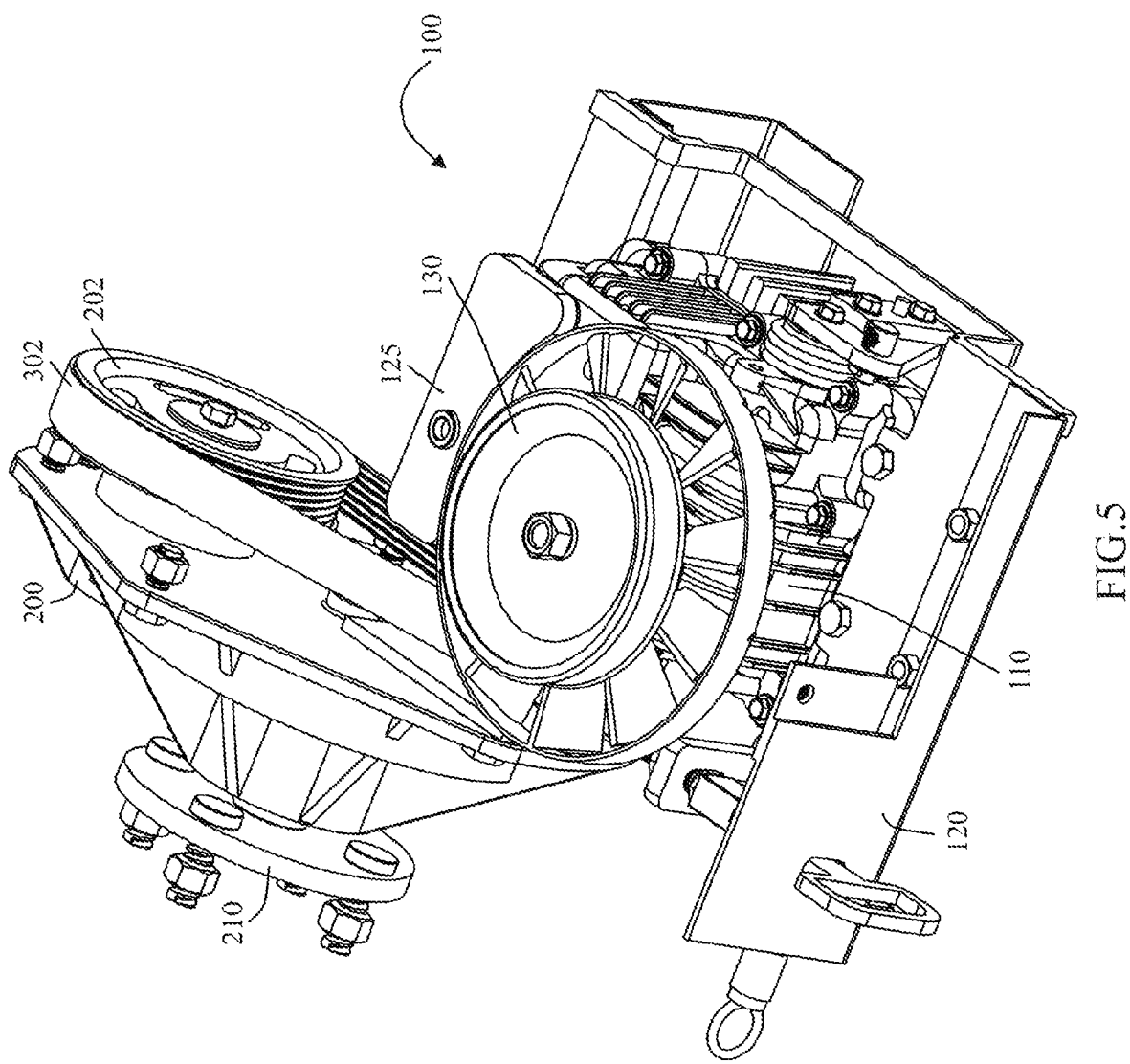
FIG. 5 shows a rear perspective view of half of the hydraulic system of FIG. 2 with a Multi V-Belt attached in accordance with one aspect of the present invention.

FIG. 3 displays a top view of the drive system 100. As can be seen in FIG. 3, the output drive pulley 103 is on the same plane as the receiving pulley 202. A Multi V-belt 302 connects the output drive pulley 103 and the receiving pulley 202. FIG. 4 shows a front perspective view and FIG. 5 shows a rear perspective view of the drive system 100 with the Multi V-belt attached.

Figure 6:
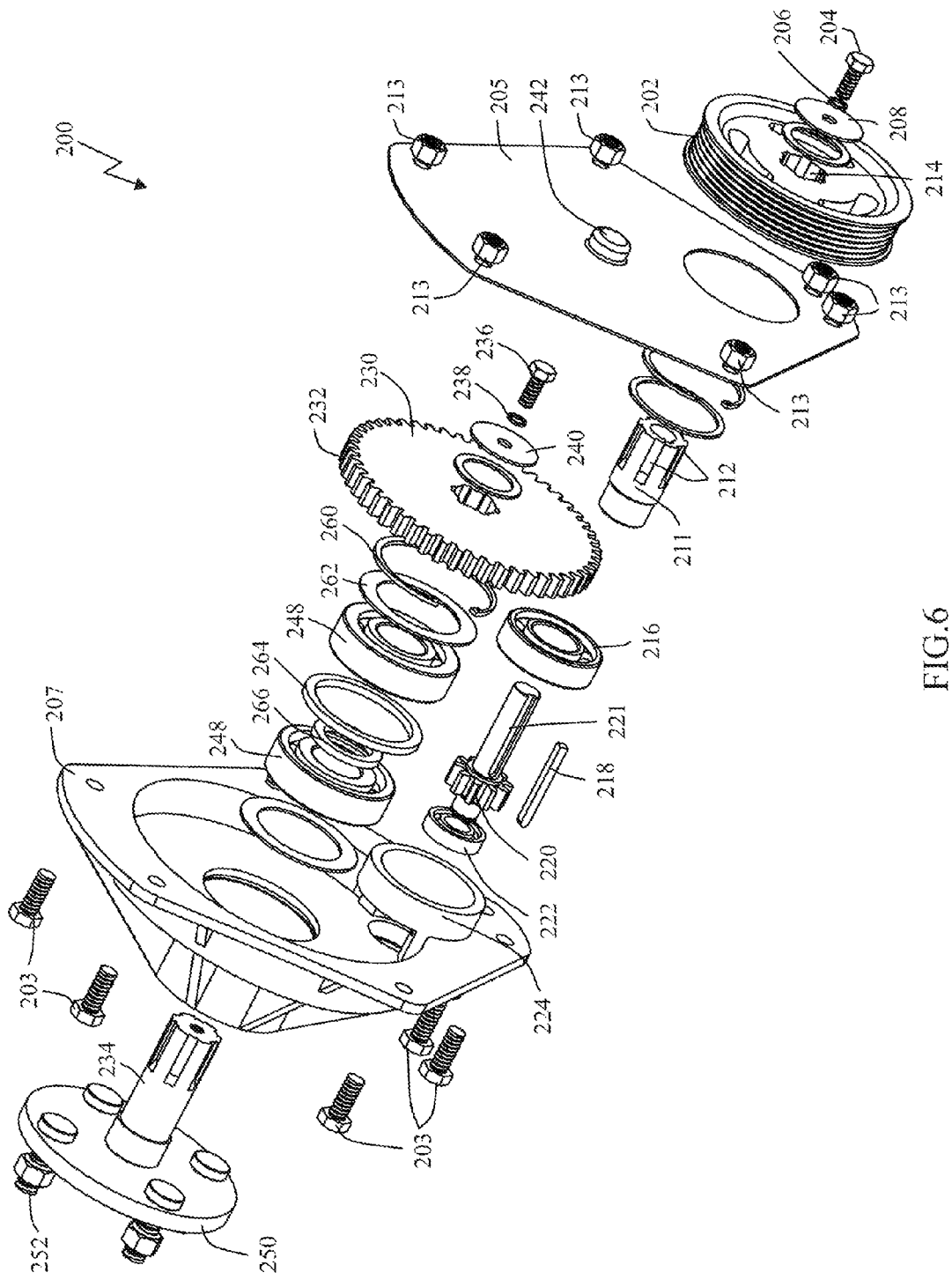
FIG. 6 shows an exploded view of an integrated wheel hub in accordance with one aspect of the present invention.

FIG. 6 shows an exploded view of a wheel hub assembly 200 in accordance with one embodiment of the present invention. The wheel hub assembly 200 has a drive cover 205 and drive housing 207. The drive cover 205 and the drive housing 207 are secured into place with six housing bolts 203 and six housing nuts 213. The number of housing bolts 203 and nuts 213 may vary depending on the mounting. Alternatively, the drive cover 205 may be pinched between the final drive and the chassis.

Contained within drive cover 205 and the drive housing 207 are internal components which provide the energy transfer from the receiving pulley 202 to an output hub 250. Connected to the output hub 250 may be a tire, wheel or other type of mechanism taking the rotational energy from the receiving pulley 202 and providing a propulsion or propulsive force.

Attached at one end of the wheel hub assembly 200 is the receiving pulley 202. The receiving pulley 202 is affixed into place by a pulley retainer bolt 204 which is inserted through a lock washer 206 and a flat washer 208. The receiving pulley 202 is connected to a splined intermediate shaft adapter 211 having splines 212. The splines 212 match up to splines 214 in the receiving pulley 202. Connected to the splined intermediate shaft adapter 211 is a ball bearing assembly 216. Protruding through the ball bearing assembly 216 is an intermediate shaft key 218 which is coupled to an intermediate shaft gear 220 mounted on intermediate shaft 221. In one embodiment, the intermediate shaft gear 220 may have 10 teeth. Attached adjacent to the intermediate shaft gear 220 is another ball bearing 222 which, when assembled, fits into a housing 224. In this example, the shaft connections could be tapered with woodruff keys, square sections, multiple keys, splines, serrations, or any other means to fix the parts so they turn as one unit.

Coupled to the intermediate shaft gear 220 is a main gear 230. In one exemplary embodiment, the main gear 230 may have fifty teeth 232. In the previously described embodiment, when the main gear 230 and the intermediate shaft gear 220 are coupled together, a 5:1 reduction will occur. Protruding through the main gear 230 is a splined output axle 234. The splined output axle 234 is held in place by a gear retainer bolt 236, locking washer 238 and flat washer 240 after being inserted through the main gear 230. The head of the gear retainer bolt 236 may protrude slightly into a cavity 242 on the drive cover 205. Also located on the output axle 234 are two ball bearing assemblies 248. The ball bearing assemblies 248 and 222 are designed to keep the output axle 234 and the intermediate shaft key 218 centered as well as reduce the amount of friction encountered by the output axle 234 and the intermediate shaft key 218 respectively. Also connected on the output axle 234 are washers 262, spacers 264 and 266, as well as snap ring 260.

On the other end of the output axle 234 at the output hub 250 are lugs 252 upon which a tire, wheel or other type of propulsion mechanism may be attached. When the wheel hub 200 is fully assembled, the components will be protected from the elements, thus allowing any power equipment using the drive system to operate in all types of weather conditions. When the wheel hub assembly 200 is attached to a frame of the power equipment (see FIG. 10), it is cantilevered onto the frame and the output axle 234 is positioned outside of the frame.

The part of the wheel hub assembly that protrudes into the frame is a portion of the intermediate shaft adapter 211, the receiving pulley 202 and the associated pieces to secure the receiving pulley into place (the pulley retainer bolt 204, the lock washer 206 and the flat washer 208). One advantage of mounting the wheel hub assembly 200 on the outside of the frame is that it allows the wheel hub assembly 200 to be positioned in areas that might not have been available had it been positioned inside the frame. In addition, it also allows the power equipment manufacturer to free up space inside the frame to potentially move the hydrostatic transmissions or make the frame smaller to reduce costs.

Although the embodiment as shown in FIG. 6 has multiple gears, the inventive concepts as presented herein may be applied to a direct drive system where the receiving pulley may be directly linked to the output hub via a main axle.

Figure 7:
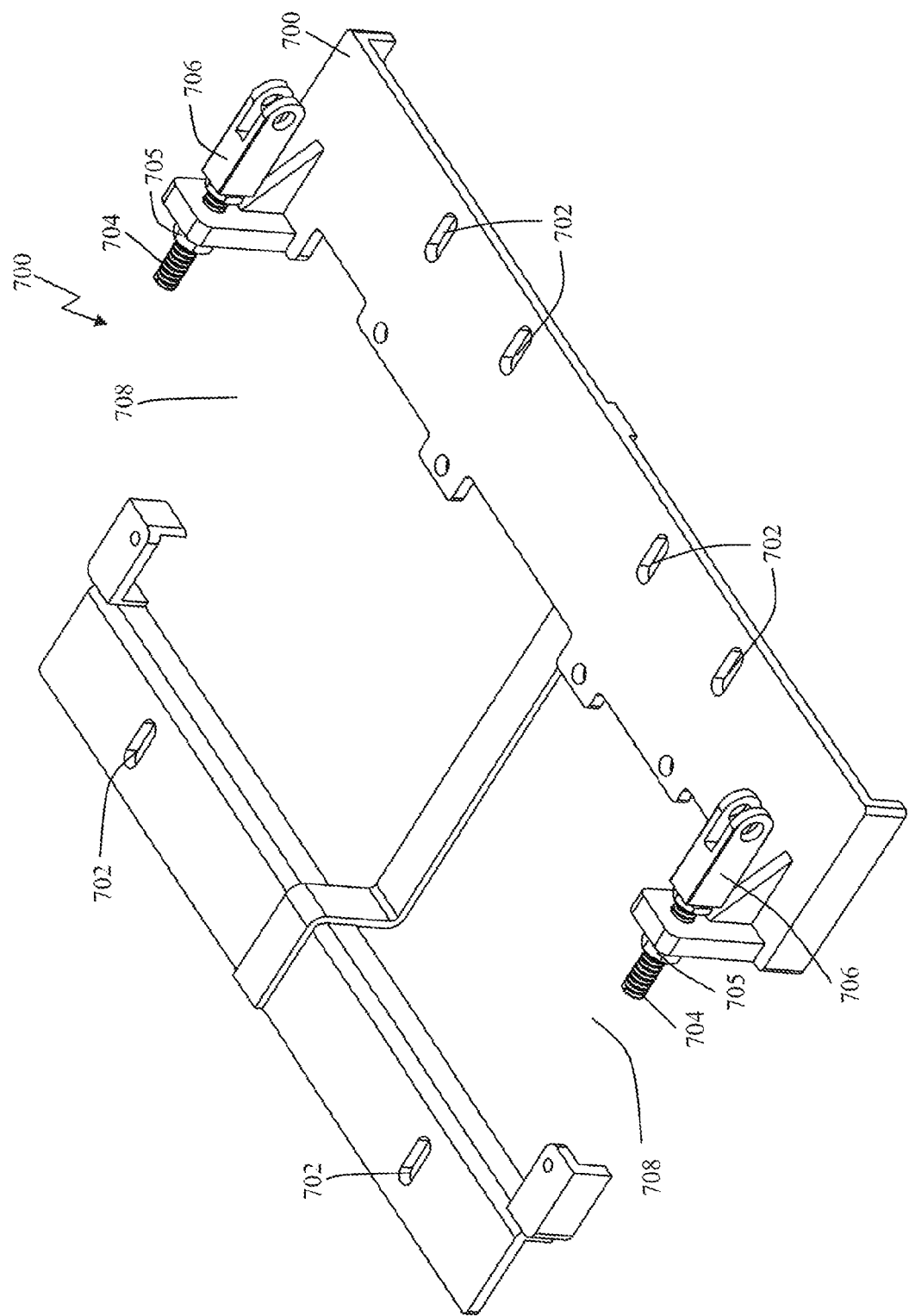
FIG. 7 shows an empty hydraulic pump carrier in accordance with another embodiment of the present invention.

FIG. 7 shows a perspective view of a hydrostatic transmission carrier 700 which connects to the chassis 120. The hydrostatic transmission carrier 700 is shown without the hydrostatic transmissions 110. The hydrostatic transmissions 110 are inserted into gaps 708 and are affixed onto the hydrostatic transmission carrier 700 using bolts (not shown). The hydrostatic transmission carrier 700 has various guide slots 702 located around its perimeter. Once the hydrostatic transmissions 110 are mounted into the hydrostatic transmission carrier 700 and then in turn into the chassis 120, the guide slots 702 allow the carrier 700 to travel either closer to or away from the wheel hub 200, thus creating/increasing or relieving/decreasing tension on the Multi V-belt 302.

Another aspect of the present invention is the ability to disengage the propulsion system when necessary. For example, even though the engine may be off and hydraulic fluid may not be flowing through the hydrostatic transmissions 110, the receiving pulley 202 may remain locked in place. This may be caused due to the internal hydrostatic pressure within the hydraulic transmission 110. When the output pulley 103 is linked to the receiving pulley 202 by the Multi-V belt, the output hub 210 may not be able to turn freely because of checked pressure within the hydrostatic pump and motor.

Unlocking the output hub 210 and allowing the wheels of the mower to move may be important should the user want to move the mower without the engine running. Having this feature may be an advantage when used with hydrostatic transmissions that do not have a hydraulic bypass or other bypass mechanism. Other types of bypass mechanisms may include, but are not limited to:

Electromagnetic pto (power take off) on one of the pulley shafts. As those skilled in the art may appreciate, a pto may consist of a pulley mounted independently from an electromagnet and when a voltage is removed, the magnet and pulley become decoupled and the wheels would be able to freewheel.

A "shifter fork" to slide a pulley or a sprocket off of a spline or square section to a round section that uses a spring or the other side of the fork to push/pull the pulley back on the spline, etc. to lock it back together with the shaft.

Mechanically slide a gear out of line within the final drive casting.

Figure 9:
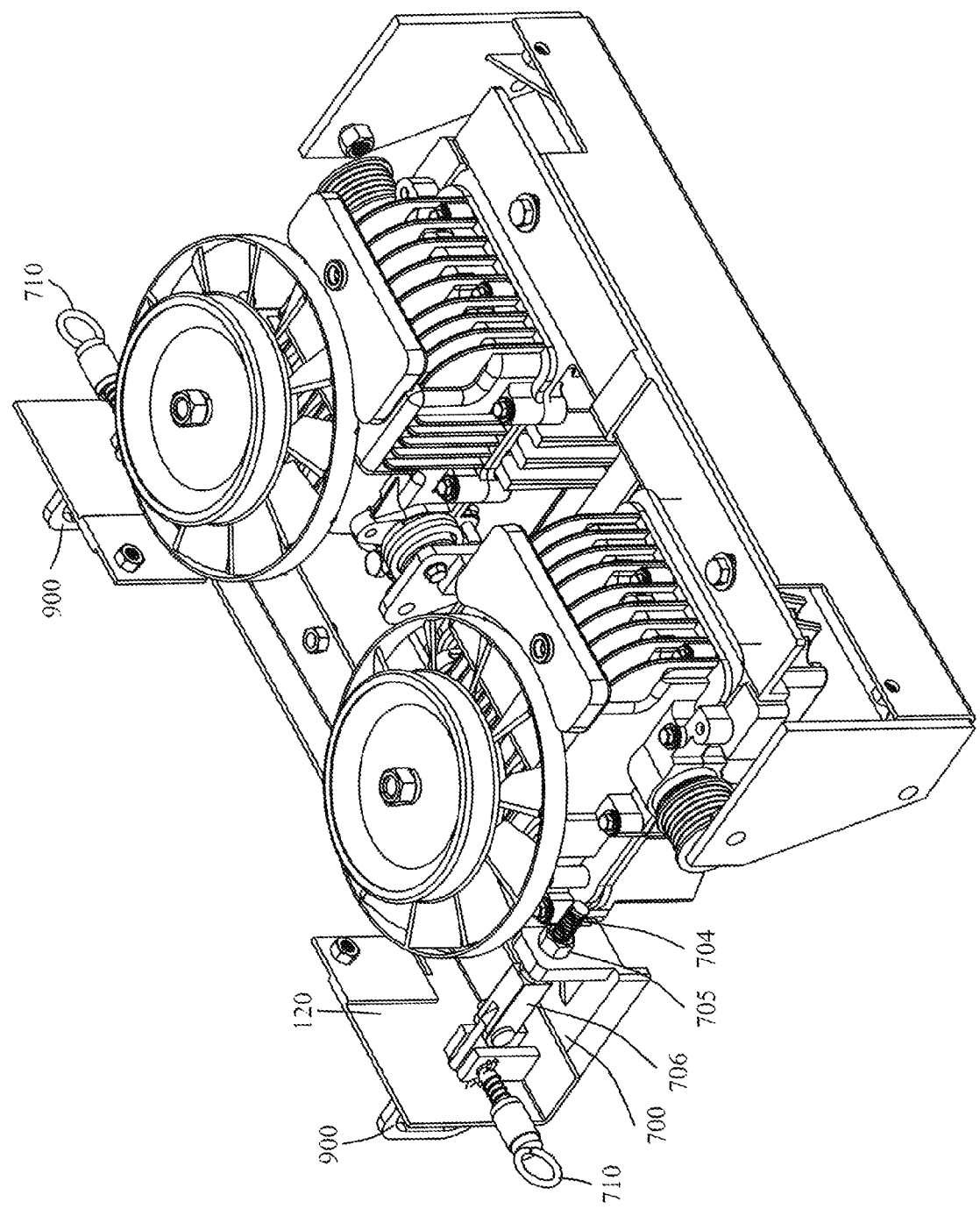
FIG. 9 shows the hydraulic pump carrier installed on the chassis.

Shown in FIG. 9 are two adjustment rods 704 on the hydraulic pump carrier 700. At one end of the adjustment rod 704 is a coupling 706 and an adjustment nut 705. The two adjustment rods 704 provide a means for adjusting the distance separating the output drive pulley 103 and the receiving pulley 202. The two adjustment rods 704 may be attached to the chassis 120 through the coupling and held in place by a spring loaded pin 710. In one embodiment, by tightening the two nuts 705, the distance separating the output drive pulley 103 and the receiving pulley 202 becomes greater, thus increasing the tension on the Multi V-belt or whatever linkage system is used to connect the output pulley 103 to the receiving pulley 202.

Figure 8:
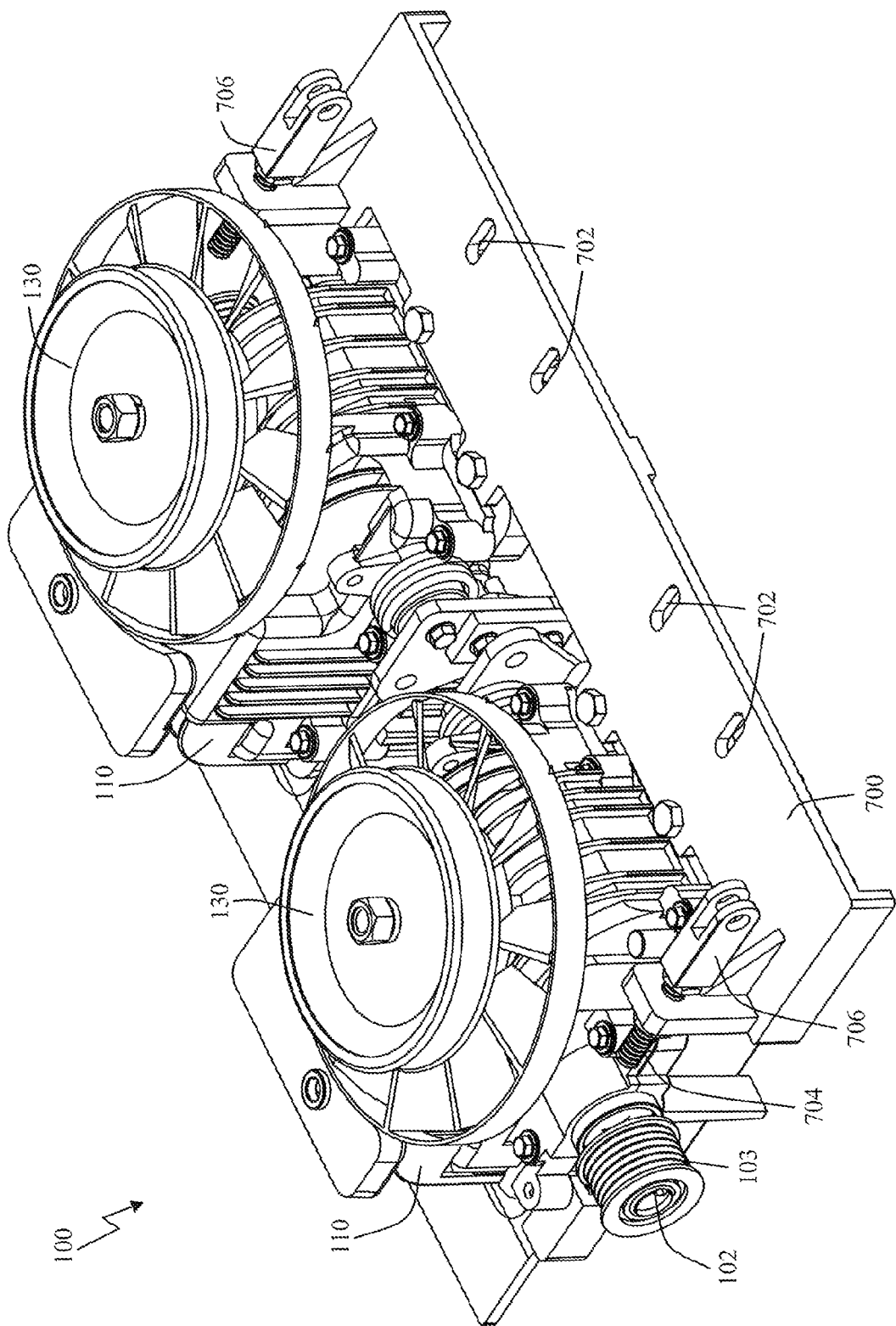
FIG. 8 shows a rear perspective view of two hydraulic pumps installed on the hydraulic pump carrier of FIG. 7.

FIG. 8 shows the hydrostatic transmissions 110 installed on the hydraulic pump carrier 700. FIG. 9 shows the addition of the spring loaded pin 710 which is inserted into the coupler 706. If there are two hydrostatic transmissions 110, there may be two rods 704, two couplers 706 and two spring loaded pins 710. The position of the chassis 120 is determined by the combination of the adjustment rods 704 and couplers 706 in conjunction with a spring loaded pin 710. When the spring loaded pin 710 is removed, the hydrostatic transmission carrier 700 may slide forward thus causing the tension in the Multi V-belt to be released. It is important that the amount of slide is not too great because the Multi V-belt(s) may come off the output drive pulley 103. In one embodiment, the hydrostatic transmission carrier 700 would travel about ½ to ¾ an inch. This would be enough distance to allow the Multi V-belt to go slack enough to let the wheels turn without much resistance, but not too far as to allow the Multi V-belt to come off. When the hydrostatic transmission carrier 700 is in the freewheel position, an external force can be applied to remove the Multi-V belt from the receiving pulley 202. The force may not be excessive and as such prying may not be necessary. The amount of travel is limited, so typically the belt won't come off without an external force applied thereto.

FIG. 9 displays a view of the rod 704, the coupler 706 and the spring loaded pin 710. The two positioning handles 900 are shown attached to the carrier 700. The positioning handles 900 may be used to return the chassis back into position. For example, after the spring loaded pins 710 are removed, the chassis may be slid forward to loosen the tension on the Multi-V belt. When it is desired to return the chassis back to the engaged position, the positioning handles 900 may be grasped and pulled at the same time the spring loaded pin 710 is inserted into the coupler 706. In an alternate embodiment, a tool may be used to pull the positioning handles 900 in the instance where the Multi-V belt tension demand may be higher. In this instance, the tool may be a pry bar that can also be used to pull the spring loaded pins which would release the hydrostatic transmission carrier 700, allowing the Multi-V belt to loosen.

Figure 10:
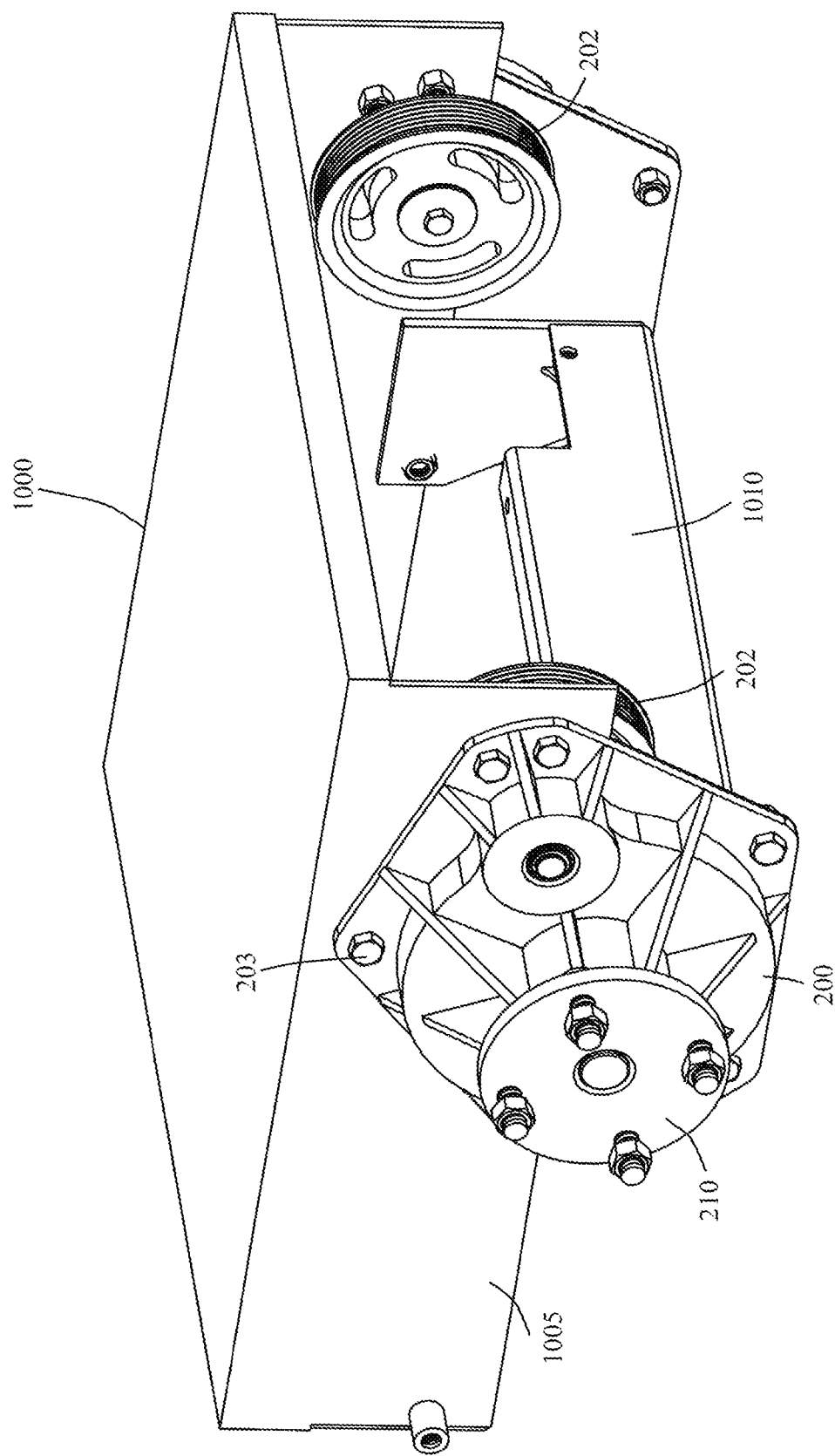
FIG. 10 shows two wheel hub assemblies attached to a frame.

FIG. 10 displays a side perspective view of two wheel hub assemblies 200 installed on an outside wall 1005 of a frame 1000. In another embodiment of the present invention, the frame 1000 may have multiple mounting holes to accommodate different mounting positions that the wheel hub assemblies 200 may be affixed to. This would allow the lawn mower manufacturer to have one frame 1000 that may be used with different mower models that may have different wheel sizes and different speed ranges. One advantage is that the same wheel hub assemblies 200 and hydrostatic transmissions 110 may be used in either model with only a different length Multi-V belt being different.

As can be seen in FIG. 10, a cross member 1010 may be affixed onto the frame 1000 to add support. When the wheel hub assemblies 200 are cantilevered on the frame, the output axle 234 (see FIG. 6) is positioned outside the frame 1000. The cross member 1010 may keep the frame 1000 from flexing due to the stress applied to the frame caused by the rotational energy applied to the receiving pulley 202. Installing the wheel hub assembly 200 on the outside wall 1005 of the frame 1010 allows the power equipment manufacturer more flexibility in determining the location, size, position and orientation of the hydraulic transmissions 130 which may be installed in the interior of the frame 1000.

Figure 11:
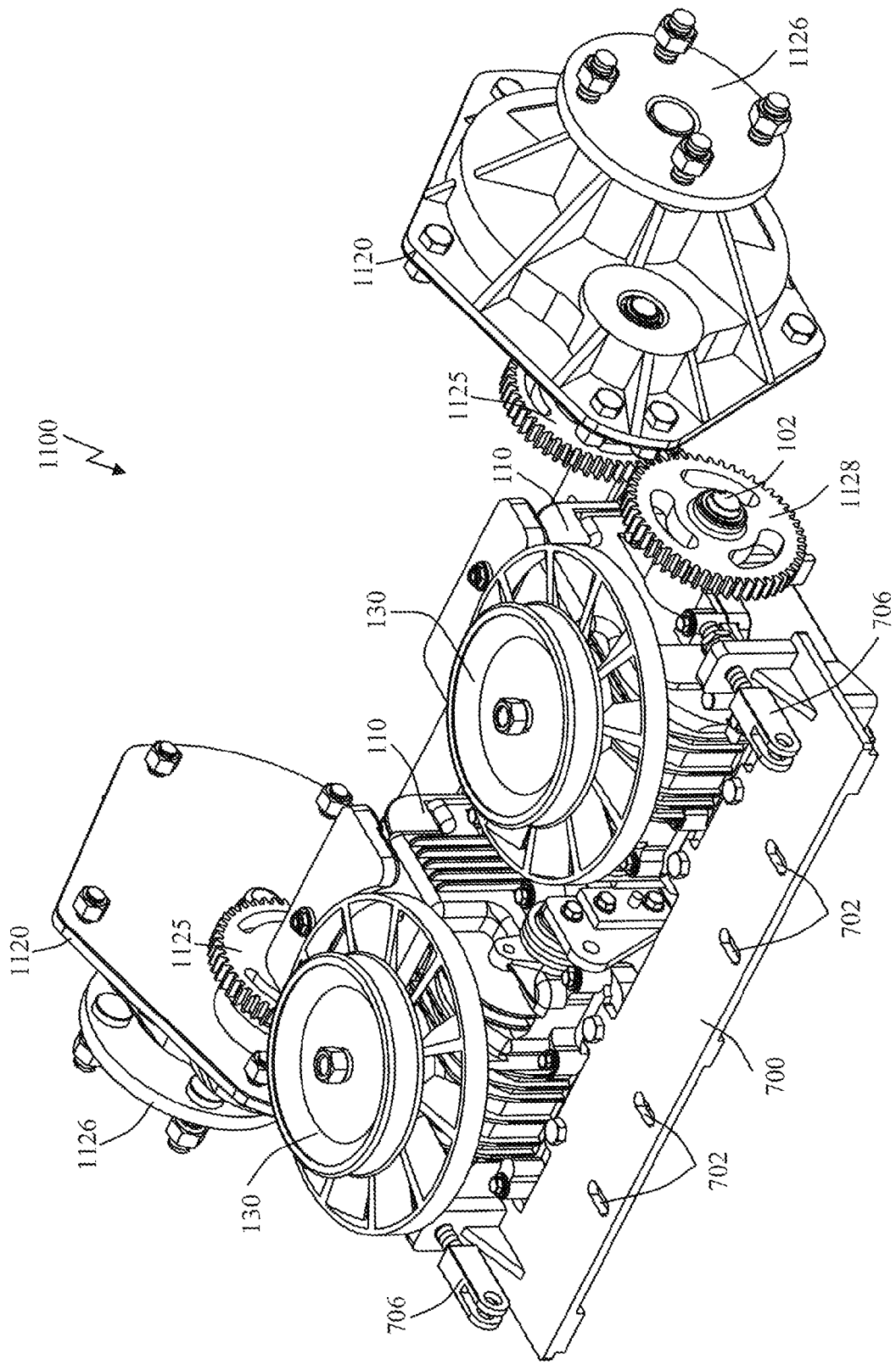
FIG. 11 displays a rear perspective view of a hydraulic drive system in accordance with a further aspect of the present invention.

FIG. 11 shows a rear perspective view of a hydraulic drive system 1100 in accordance with another embodiment of the present invention. The hydraulic drive system 1100 is similar to the previously described hydraulic drives except that the output member 1128 attached to the output shafts 102 of the hydrostatic transmissions 110 are gears. The wheel hub assembly 1120 may be similar to the wheel hub assembly 200 and as such may have an output hub 1126. In one embodiment, a wheel may attach to the output hub 1126 and as the receiving member 1125 turns, the output hub 1126 may also turn.

As can be seen in FIG. 11, the output members 1128 couple with receiving members 1125 on wheel hub assemblies 1120. In the embodiment as shown, the output drive gears mesh up with receiving gears that are attached to wheel hub assemblies 1120. Similar to the previous examples, the wheel hub assemblies 1120 may be attached to a frame 360 degrees around the output shaft as long as the output drive gear is able to mesh with the receiving gears.

The output member 1128 and the receiving member 1125 may be variable in dimension to achieve a range of torques and speeds. For example, if the output member 1128 was smaller in diameter than the receiving member 1125, the output hub 1126 may turn slower but with more torque. However, if the diameter of the output member 1128 were to increase, the rotational speed of the output hub 1126 may also increase with decreasing torque.

Figure 12:
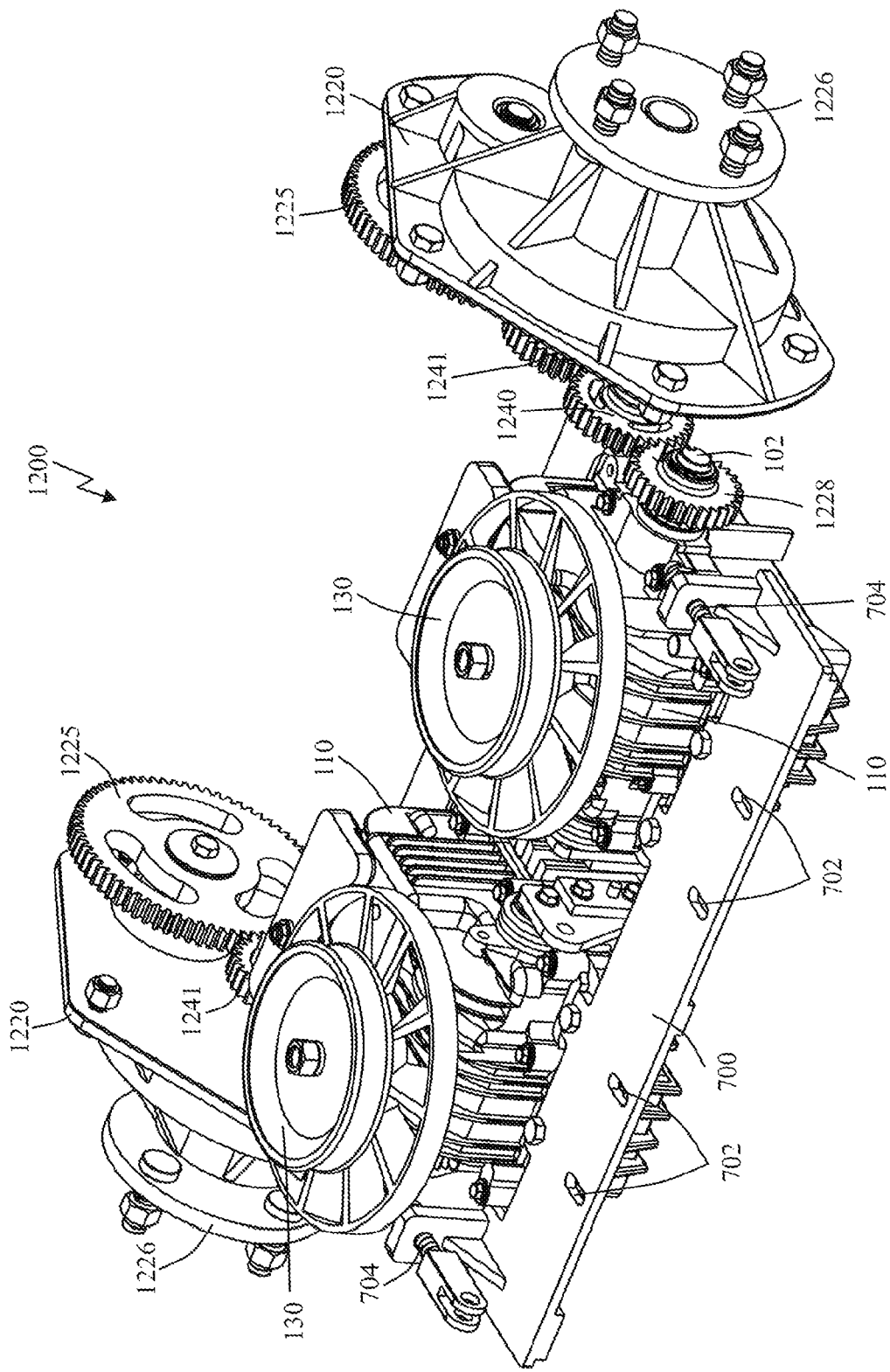
FIG. 12 displays a rear perspective view of a hydraulic drive system in accordance with a further aspect of the present invention.

FIG. 12 displays a rear perspective view of a hydraulic drive system 1200 in accordance with another embodiment of the present invention. The hydraulic drive system 1200 is similar to the hydraulic system 1100 in that the output member 1228 attached to the output shafts 102 of the hydrostatic transmissions 110 are gears. The wheel hub assembly 1220 is also similar to the wheel hub assembly 1120 and as such may have an output hub 1226 as well as receiving member 1225.

However, as can be seen in FIG. 12, the output members 1228 couple with intermediate members 1240 and 1241 in addition to receiving members 1125. In this embodiment, the output drive gears mesh up with intermediate gears and then to receiving gears that are attached to wheel hub assemblies 1220. Similar to the previous examples, the wheel hub assemblies 1220 may be attached to a frame in various configurations with the intermediate members 1240 and 1241 being positioned in different radial locations around the output member 1228 and receiving member 1225 as long as all of the members mesh up. The diameter of the various members (1228, 1240, 1241 and 1225) may be variable in dimension to achieve a range of torques and speeds.

Figure 13:
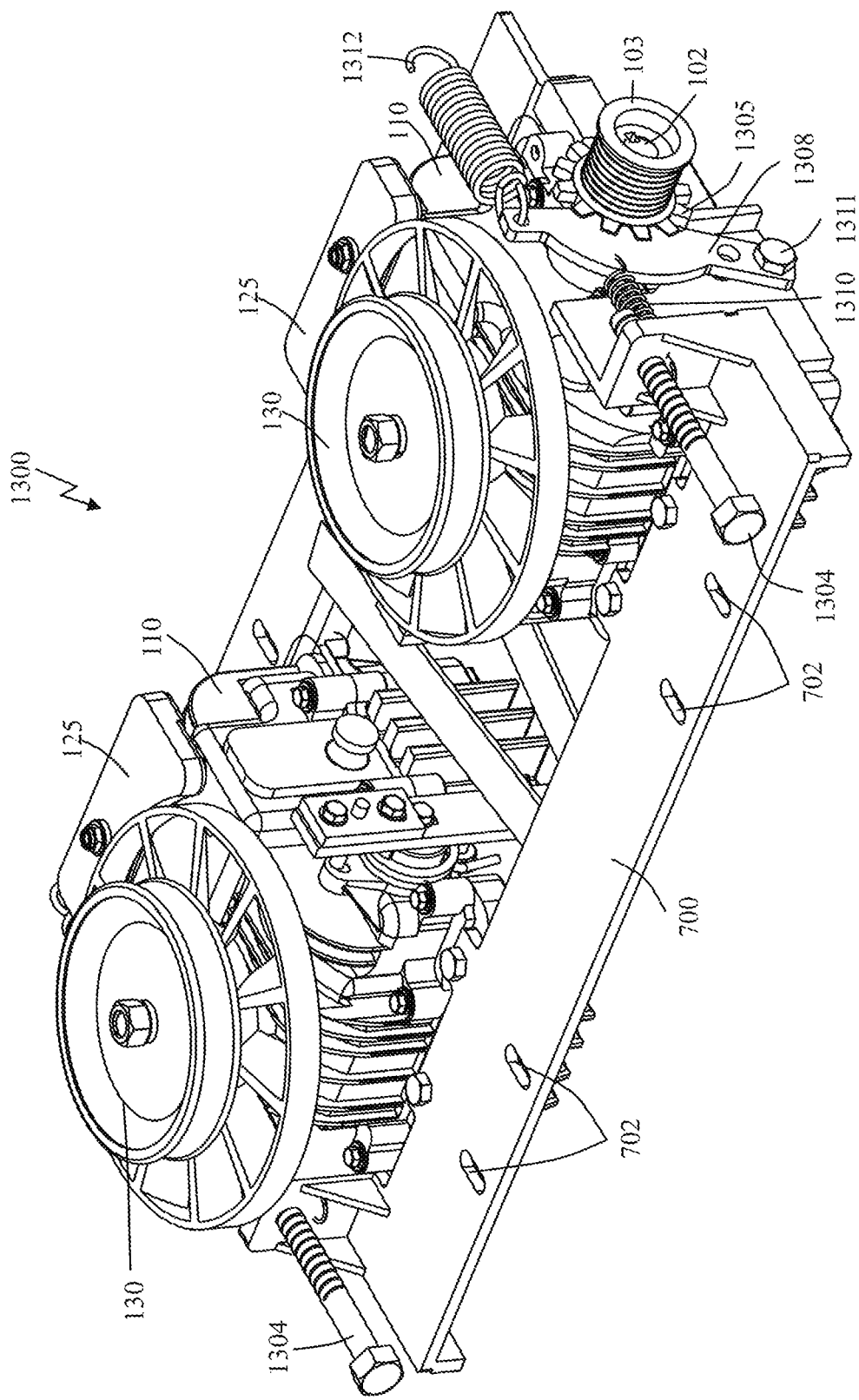
FIG. 13 displays a rear perspective view of a hydraulic drive system with a brake in accordance with one aspect of the present invention.

FIG. 13 displays a rear perspective view of a hydraulic drive system 1300 mounted in hydrostatic transmission carrier 700 in accordance with another embodiment of the present invention. The hydraulic drive system 1300 is similar to the hydraulic system 100 in that positioned at the end of output drive shaft 102 of the hydrostatic transmission 110 is an output member. In the embodiment of FIG. 13, the output member may be an output pulley 103. Attached to the output pulley 103 are teeth 1305. A brake 1308 may be positioned near the output pulley 103. As can be seen in FIG. 13, the brake 1308 is shown in the engaged position. The brake 1308 may have grooves which mate up with the teeth 1305 when the brake is engaged. When engaged, the brake may prevent the output pulley 103 from turning. Correspondingly, if the pulley 103 is restricted from turning, any wheel assembly attached thereto may also be restricted from turning.

In the embodiment of FIG. 13, the brake 1308 pivots around bolt 1311. Attached in the center of the brake 1308 is a disengaging spring 1310. Correspondingly, an engaging spring 1312 is attached to the non-pivoting end of the brake 1308. Attached to the engaging spring 1312 may be a lever or other type of engagement mechanism (not shown for ease of illustration). When the operator pulls the engagement lever, tension is applied to the engagement spring 1312 which pulls the brake 1308 towards the pulley 103. When the engagement lever is released and the tension is removed from the engagement spring 1312, the tension applied to the brake 1308 by the disengaging spring 1310 pulls the brake 1308 away from the pulley 103. Although only one brake 1308 is visible in FIG. 13, the hydraulic drive system 1300 may have another brake on the other hydraulic drive 110. In other embodiments, the engaging spring 1312 may be removed and a cable may connect directly to the brake 1308 linking the engagement mechanism and the brake 1308.

Also shown in FIG. 13 are two adjustment members 1304. In the embodiment of FIG. 13, the adjustment members 1304 are bolts. When hydraulic drive system 1300 is installed in power equipment and the output pulley 103 is attached to a wheel hub assembly 200 (see FIG. 2) by a linkage member, the adjustment members 1304 may be tightened to adjust the amount of tension applied to the linkage member. Visual indicators (not shown for ease of illustration) may be placed on the adjustment members 1304 as well as chassis 120 (see FIG. 9) to indicate the suggested linkage member tension.

For example, when attached, the adjustment members 1304 may be tightened to a specific torque, such as 70 ft/lbs, which may correspond to a specific linkage member tension. The ability to adjust the amount of tension applied to the linkage member may be advantageous for some lawn mowers such as a zero turn radius lawn mower. For example, a landscaper may want the tension to be relatively loose (60 ft/lbs) when mowing wet grass. When cutting wet grass, the landscaper may want the belt to slip rather than allow the wheels to turn in the soft turf. This may keep the wheels from tearing up the turf and causing damage to the grass.

Although specific embodiments have been illustrated and described herein, those of ordinary skill in the art appreciate that any arrangement, which is calculated to achieve the same purpose, may be substituted for the specific embodiments shown and that the invention has other applications in other environments. For example, the inventive concepts as described herein may be applied to various types of powered equipment including but not limited to riding lawn mowers, walk behind lawn mowers, snow blowers, golf carts, go-karts and the like. This application is intended to cover any adaptations or variations of the present invention. The following claims are in no way intended to limit the scope of the invention to the specific embodiments described herein.

What is claimed is:

1. An assembly for propelling a pair of output wheel hubs having a connection for attaching a wheel of an engine powered piece of equipment comprising:
   (a) two integrated hydrostatic transmissions driven by a connection to the engine wherein when each hydrostatic transmission is driven it creates rotational energy directed to a hydrostatic transmission output shaft having an output wheel hub assembly connection member with an attached variable length linkage member;
   (b) two wheel hub assemblies each comprising a receiving member that receives the rotational energy from one corresponding hydrostatic transmission output wheel hub assembly connection member via a connection by the linkage member wherein the receiving member can rotationally drive an output wheel hub attached to the wheel hub assembly such that each output wheel hub can rotate independently of the other output wheel hub;
   (c) wherein each wheel hub assembly is positioned radially with respect to the corresponding hydrostatic transmission output shaft at a radius determined by the linkage member length.

2. The assembly according to claim 1 wherein the connection to the engine is a pulley and belt driven rotational connection.

3. The assembly according to claim 1 wherein the wheel hub connection member is a pulley and the linkage member a drive belt.

4. The assembly according to claim 1 wherein the wheel hub connection member is one or more gears and the linkage member is one or more gears that mate to the wheel hub connection member.

5. The assembly according to claim 1 wherein the output wheel hubs are each adapted to receive a wheel.

6. The assembly according to claim 5, wherein the output wheel hubs are adapted to receive the wheel via wheel lugs.

* * * * *